Feb. 6, 1968
L. A. MITTEN
3,367,377
CUTTER HEAD WITH SLIDE-MOUNTED CHIP-COLLECTING DUCT
Filed Nov. 26, 1965
3 Sheets-Sheet 1
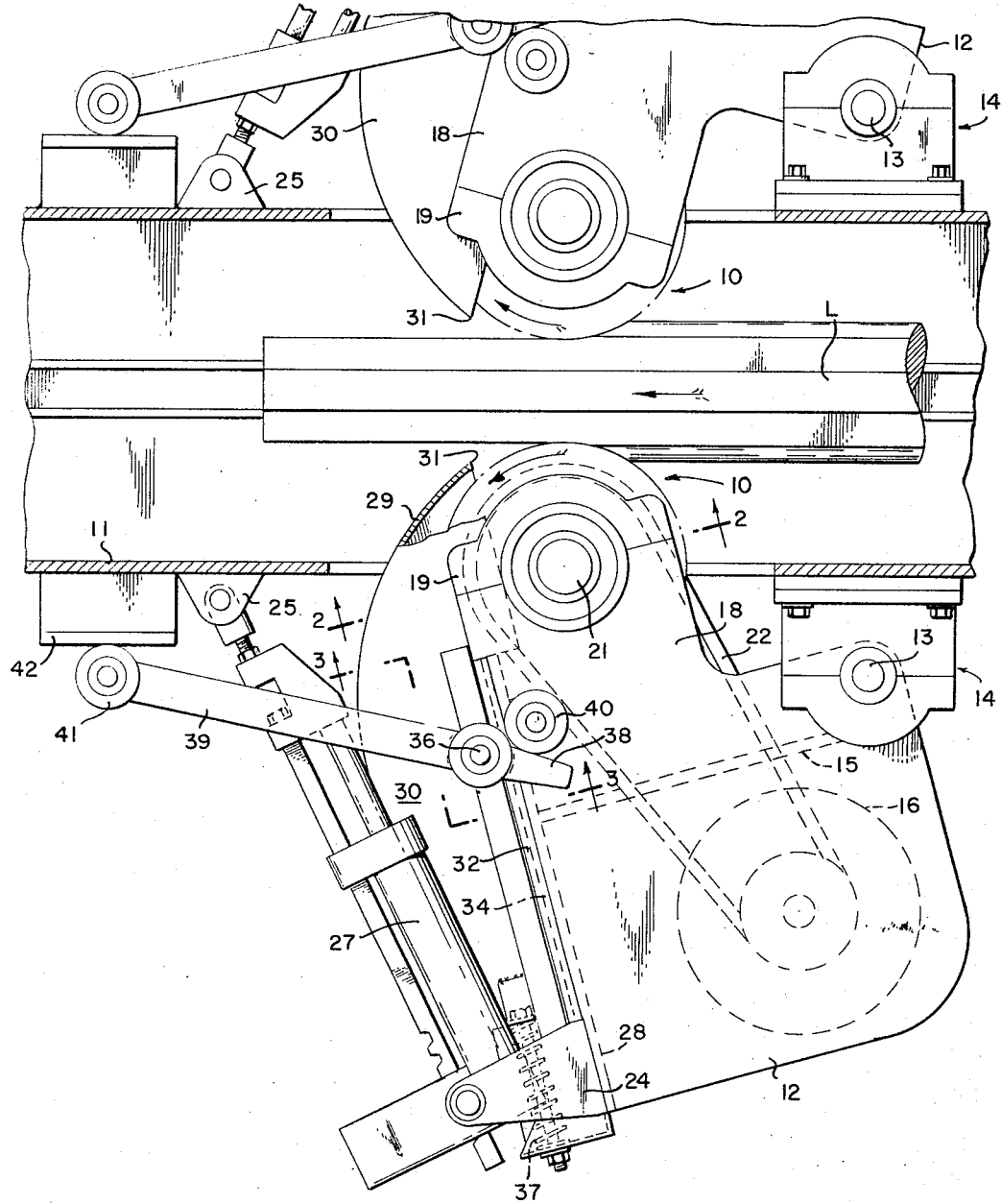
FIG—1
LEONARD A. MITTEN
INVENTOR.
BY
ATTORNEYS Feb. 6, 1968　　　　　　L. A. MITTEN　　　　　　3,367,377
CUTTER HEAD WITH SLIDE-MOUNTED CHIP-COLLECTING DUCT
Filed Nov. 26, 1965　　　　　　　　　　　　3 Sheets-Sheet 2
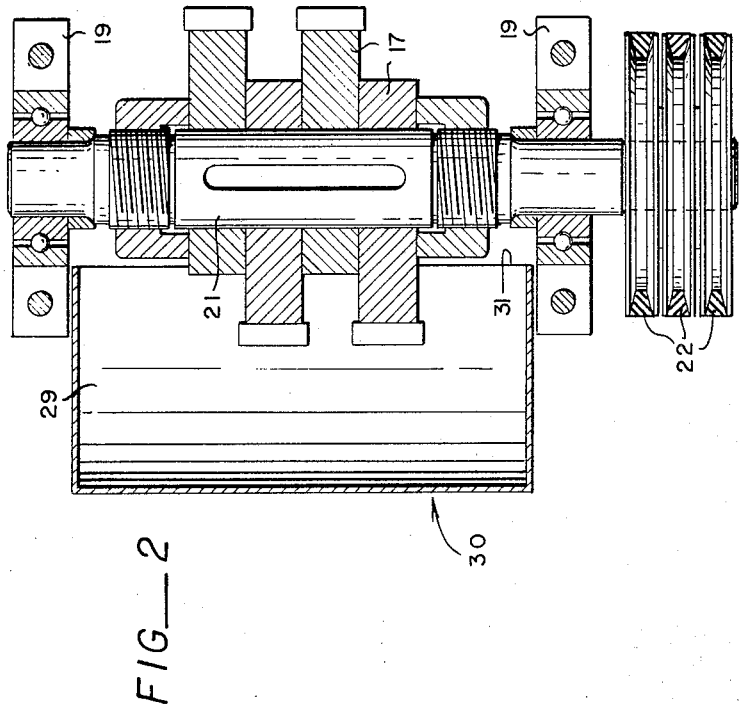
FIG_2
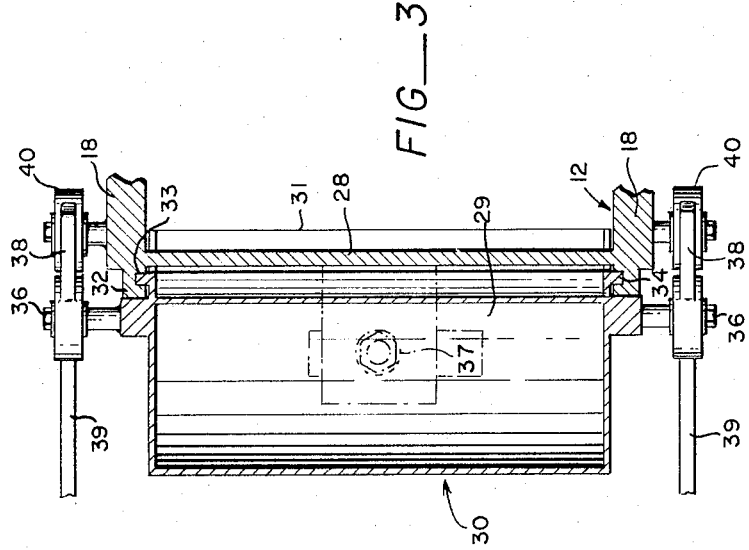
FIG_3
LEONARD A. MITTEN
*INVENTOR.*
BY *Seed & Berry*
ATTORNEYS

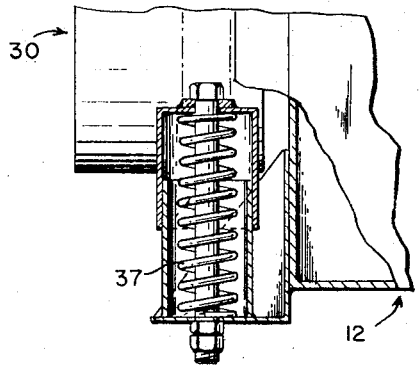
FIG__4
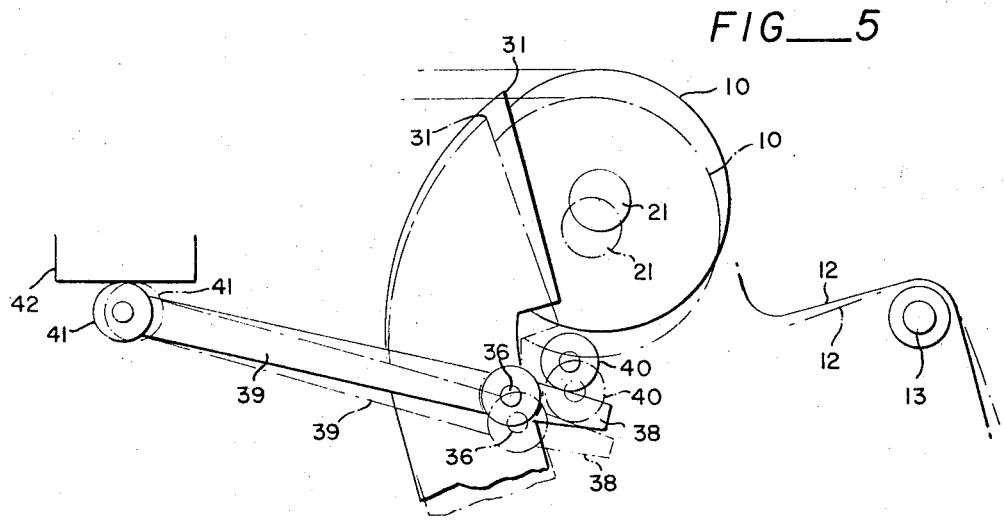
FIG__5

United States Patent Office 3,367,377
Patented Feb. 6, 1968

3,367,377
CUTTER HEAD WITH SLIDE-MOUNTED CHIP-COLLECTING DUCT
Leonard A. Mitten, Vancouver, British Columbia, Canada, assignor to Ernest E. Runnion, Shelton, Wash.
Filed Nov. 26, 1965, Ser. No. 509,698
7 Claims. (Cl. 144—114)

This invention relates to a mill for profiling logs so as to reduce the log to a cant suitable for the production of dimensional lumber. The profiling is performed by cutter heads as the logs are conveyed along a linear travel path, and the present invention pertains especially to a mill in which at least one of the cutter heads is carried by a swing-frame permitting the cutter head to be swung into a selected one of several positions spaced different distances from the longitudinal median line of the log's travel path, thus to accommodate the mill to logs of different diameters.

The cutter heads are caused to rotate in a "climb-cut" direction so that the wood which is removed from the periphery of the log is in the form of chips suitable for use in a high-grade pulping operation. To insure an economical collection of the chips and also to maintain the chips in a clean condition dictates that the chips thrown from the cutter head be directed into a chute and funneled thereby to a receiving bin. Chutes are commonly designed so that they provide at their ingress end a chip-trapping infeed lip, and it is important that there be no more than a moderate spacing between this lip and the cutting plane of the cutter head. This presents no problem when the cutter head occupies a localized station, i.e. rotates about a fixed axis. Nor is there any problem in an installation where the cutter head moves in a slide mounting so that its travel is linear. In either such case the chute can be fixedly associated with the frame which carries the bearings in which the cutter head is journaled.

The present invention, for its principal object, aims to provide a chute for collecting chips thrown from a cutter head which is swingably mounted, and a chute in which maintains a gap of substantially fixed width between its infeed lip and the cutting plane of the head range into which the head may be swung.

This and other objects and advantages of the invention will appear and be understood in the course of the following description and claims, the invention consisting in the novel construction and in the adaptation and combination of parts hereinafter described and claimed.

In the accompanying drawings:

FIGURE 1 is a fragmentary top plan of a log-profiling mill having swingably mounted cutter heads, and illustrating chip-collecting chutes therefor constructed to embody preferred teachings of the present invention. The view incorporates a fragmentary showing of a conveyed log in course of being profiled.

FIGS. 2 and 3 are vertical sectional views, the latter fragmentary, drawn to an enlarged scale on lines 2—2 and 3—3, respectively, of FIG. 1.

FIG. 4 is a similarly enlarged fragmentary horizontal section detailing the spring assembly shown in phantom in FIG. 1; and FIG. 5 is a view indicating schematically the manner in which the chute of the present invention maintains its chip-trapping lip in substantially an unchanging position relatve to the cuttng plane of the concerned cutter head regardless of the location occupied by the cutter head.

Referring to said drawings, the letter L denotes a log in course of being conveyed within a profiling mill along a linear travel path, and the numeral 10 designates cutter heads occupying positions at opposite sides of said travel path and mounted for opposing swing movements inwardly and outwardly relative to said path into a selected one of a plurality of positions each of which positions is correlated to a respective one of a number of different log diameters. A main frame for the mill is indicated fragmentarily at 11, and the mounting for each cutter head is provided by a respective swing-frame 12. The swing-frame is pinned or otherwise fixed to a wrist pin 13, and the wrist pin has its ends journaled between the base and cap components of bearing blocks 14 which are secured to the main frame. The swing-frame has a center wall 15, and an electric motor 16 is hung from the wall in a boxed compartment which is provided at the swing-frame's outer end.

Disc sections 17 (FIG. 2) which carry the knives of the cutter head are received at the inner end of the swing-frame in a stall which is defined between side arms 18. Caps 19 complement notched end walls of the side arms to form a journal for the ends of a live arbor 21 for the cutter head. The drive is carried from the armature shaft of the electric motor to the arbor by means of a belt 22 located below the swing-frame. The direction in which the cutter head rotates gives to the head a "climb-cut" action relative to the conveyed log.

Swing movement of the swing-frame is governed by a pneumatic double-acting jack 27 linking a bracket 24 on the swing-frame to a lug 25 on the main frame 11. Shift movements of the piston within the cylinder of the jack are made to respond automatically to the reading of a log's diameter—performed by a sensing device—in the course of the log's conveyed travel to the cutting station occupied by the cutter heads. Should the sensed diameter show that a log has a diameter placing the same in a bracket different from that of the preceding log, the sensing device acts through suitable circuitry to actuate mechanism which shifts the swing-frame to and sets the same in a position having a predetermined correlation to the sensed diameter. It will be understood that the shift-and-set action is performed after a preceding log has cleared the cutter heads and before the diameter-sensed log has reached same. The circuitry and mechanism employed is or may be similar to that illustrated and described in application for Letters Patent of the United States, Ser. No. 453,547, filed by Ernest E. Runnion Apr. 23, 1965, now Patent No. 3,259,157, as a continuation of an earlier application filed July 13, 1962, and may include improved structure which I have devised and for which an application for patent is now in process of preparation.

A duct 30 overlies the back wall 28 of the swing-frame. Its function is to collect pulp chips which are thrown peripherally from the cutter head and funnel the same first outwardly and then downwardly into a lower-level receiving bin. Other than for a chip-collecting hood at the ingress end which shrouds the cutter head directly behind the transverse vertical plane in which the chipping takes place, said hood being three-sided with the top and bottom walls planar and the back wall 29 curving forwardly to a lip 31, the duct 30 is rectangular in section and has an elbowed profile when viewed from a vantage point to the rear of its back wall.

In order for the hood to perform its chip-collecting office with maximum efficiency, it is important that the spacing between its lip 31 and the longitudinal plane in which the cutting head is performing its chipping action remain relatively constant in all positions into which the swing-frame may be shifted. To accomplish this end, which perforce would be defeated were the duct to swing with the swing-frame as an integral part thereof, the present invention (1) mounts the duct for slide movement relative into the swing-frame directively toward and from the travel path of the conveyed log in a plane which parallels the rotary axis of the cutter head and is steeply inclined from said path in the direction of the log's travel, and (2) provides between the duct and the main frame 11 a levered connection which acts automatically to shift the duct in its slide-way predetermined distances, inwardly toward the travel path of the conveyed log when the swing-frame is shifted outwardly, and outwardly from said travel path when the swing-frame is shifted inwardly.

To produce the slide-way, lip prolongations 32 of the side arms 18 overlie the horizontal section of the elbowed duct and are each formed in the inner face with a respective one of two co-planar grooves 33. Tongues 34 made integral with the duct receive a slide fit in the grooves.

Matching levers of the first order one located above and the other below the duct act in complement to provide the levered connection for shifting the duct in its slide-way. The levers are fulcrumed at 36 to the duct and lie at cross-angles to the slide-way. Against yielding inward thrust exerted upon the duct by a spring 37, the work arms 38 and the power arms 39 of the levers are brought to bear against the swing-frame 12 and the main frame 11, respectively. In the former instance the bearing engagement is between the lever arm and a roller 40 which is carried by the swing-frame. In the latter instance a roller 41 carried by the lever tracks against the outwardly facing wall of a bracket 42 fixed to the main frame. By an inspection of FIG. 5 it will be seen that the spacing between the cutting plane of the cutter head and the scoop-lip 31 of the duct remains relatively constant regardless of the position into which the swing-frame may be moved as it is swung by the penumatic jack 27.

It is thought that the invention will have been clearly understood from the foregoing detailed description of my now-preferred illustrated embodiment. Changes in the details of construction may be resorted to without departing from the spirit of the invention and it is accordingly my invention that no limitations be implied and that the hereto annexed claims be given the broadest interpretation to which the employed language fairly admits.

What I claim is:

1. In a mill for removing wood chips from a workpiece: means for conveying the work along a linear travel path through a cutting station, a swing-frame pivotally supported at said cutting station for swing movement of its free end toward and from the longitudinal median line of said travel path, a cutter head carried upon said free end and by movement of the swing-frame shiftable into a position suitable for cutting chips from the conveyed work, and a duct movably mounted upon the swing-frame serving to carry the chips away from the cutting station and having a lip at the ingress end closely spaced from the cutting plane of the cutting head and functional to trap the chips as they are thrown peripherally from the cutter head, said movable mounting permitting the duct to be located relative to the swing-frame in a position such that said spacing between the lip and the cutting plane of the cutting head can be maintained approximately uniform regardless of the position into which the swing-frame is swung.

2. Structure as claimed in claim 1, means being provided causing said relative movement of the duct, so as to maintain said uniform spacing between the lip and the cutting plane of the cutter head, to be performed automatically in response to swing movement of the swing-frame.

3. Structure as claimed in claim 1, the mounting for the duct being one which guides the duct for slide movement in a plane which parallels the pivotal axis of the swing-frame and is steeply inclined from the travel path of the conveyed work, an operative connection being provided between the duct and a stationary frame acting automatically upon a swing movement of the swing-frame to responsively so move the duct in its slide mounting that said uniform spacing is maintained.

4. Structure as claimed in claim 3, said operative connection being a levered connection acting counter to the yielding force of a spring.

5. Structure as claimed in claim 1, the mounting for the duct being one which guides the duct for slide movement in a plane located parallel to the pivotal axis of the swing-frame and steeply inclined from the travel path of the work, a spring yieldingly urging said duct along its slide-way inwardly toward said travel path, and a lever extending at cross-angles to the duct's slide-way and working in complement with the spring counter to the spring force automatically in response to a swing movement of the swing-frame to responsively so move the duct in its slide-way that said uniform spacing is maintained, said lever being pivoted intermediate its ends to the duct, bearing by one of its ends against a stationary thrust face paralleling the travel path, and taking a purchase by its other end against a member carried by the swing-frame.

6. Structure as claimed in claim 5, the stationary thrust face occupying a plane parallel with the travel path and the pivotal axis of the swing-frame, a roller which is carried by the lever providing the bearing between the lever and the thrust face.

7. Structure as claimed in claim 1, the member carried by the swing-frame and against which the lever bears comprising a roller.

References Cited

UNITED STATES PATENTS 2,687,153    8/1954    Moore _____ 114—117 XR
2,774,399    12/1956    Emmons _____ 144—117 XR WILLIAM W. DYER, Jr., *Primary Examiner.*

W. D. BRAY, *Assistant Examiner.*